US012688947B2

(12) United States Patent
Schemmel et al.

(10) Patent No.: US 12,688,947 B2
(45) Date of Patent: Jul. 21, 2026

(54) INSULATION SYSTEM FOR ELECTRIC ROTATING MACHINES, METHOD OF PRODUCTION FOR SAME AND POWDER COATING

(71) Applicant: Siemens Mobility GmbH, Munich (DE)

(72) Inventors: Florian Schemmel, Nuremberg (DE); Steffen Lang, Hallerndorf (DE); Marek Maleika, Fürth (DE); Niels Müller, Georgensgmünd (DE)

(73) Assignee: SIEMENS MOBILITY GMBH, Munich (DE)

( * ) Notice: Subject to any disclaimer, the term of this patent is extended or adjusted under 35 U.S.C. 154(b) by 187 days.

(21) Appl. No.: 18/546,474

(22) PCT Filed: Feb. 16, 2022

(86) PCT No.: PCT/EP2022/053767

§ 371 (c)(1),
(2) Date: Aug. 15, 2023

(87) PCT Pub. No.: WO2022/175304

PCT Pub. Date: Aug. 25, 2022

(65) Prior Publication Data

US 2024/0145117 A1 May 2, 2024

(30) Foreign Application Priority Data

Feb. 22, 2021 (EP) .................................... 21158492

(51) Int. Cl.
*H01B 3/46* (2006.01)
*H01B 3/30* (2006.01)
*H02K 3/30* (2006.01)
*H02K 3/32* (2006.01)
*H02K 15/10* (2025.01)

(52) U.S. Cl.
CPC ............... *H01B 3/46* (2013.01); *H01B 3/306* (2013.01); *H02K 3/30* (2013.01); *H02K 3/32* (2013.01); *H02K 15/10* (2013.01)

(58) Field of Classification Search
CPC . H01B 3/46; H01B 3/306; H02K 3/30; H02K 3/32; H02K 15/10
See application file for complete search history.

(56) References Cited

U.S. PATENT DOCUMENTS

| | | | | |
|---|---|---|---|---|
| 4,118,535 | A | 10/1978 | Banucci et al. | 428/383 |
| 9,365,756 | B1 * | 6/2016 | Jolley | C08L 79/08 |
| 2006/0240254 | A1 | 10/2006 | Kikuchi | 428/375 |
| 2012/0222884 | A1 | 9/2012 | Honda | 174/120 |
| 2012/0247807 | A1 | 10/2012 | Hanawa | 174/110 |
| 2020/0259383 | A1 * | 8/2020 | Goetz | H02K 3/345 |
| 2020/0403475 | A1 | 12/2020 | Huber | H02K 3/40 |
| 2021/0035705 | A1 | 2/2021 | Huber | H01B 3/46 |

FOREIGN PATENT DOCUMENTS

| | | | | |
|---|---|---|---|---|
| CN | 1 854 221 | | 11/2006 | C09D 179/08 |
| CN | 102 682 884 | | 9/2012 | H01B 7/02 |
| CN | 102 708 953 | | 10/2012 | H01B 7/02 |
| DE | 10 2018 202 058 | | 8/2019 | C09D 5/25 |
| DE | 10 2018 202 061 | | 8/2019 | H01B 3/30 |
| DE | 201810202058 | * | 8/2019 | |

OTHER PUBLICATIONS

Translation of DE201810202058 has been attached.*
Search Report for International Application No. PCT/EP2022/053767, 12 pages, Jun. 14, 2022.
Search Report for EP Application No. 21158492.5, 6 pages, Jul. 30, 2021.
Wang, Quanbao, "CPCH2361882P.251021. Handbook of Practical Electronic Transformer Materials and Devices," 5 pages (Chinese w/ English translation), May 31, 2003.
Chinese Office Action, Application No. 202280016416.5, 12 pages, Oct. 15, 2025.

* cited by examiner

*Primary Examiner* — Zoheb S Imtiaz
(74) *Attorney, Agent, or Firm* — Slayden Grubert Beard PLLC

(57) ABSTRACT

Various embodiments of the teachings herein include an insulation system suitable as main insulation of an electrical rotating machine of rated voltage greater than 700 volts. The insulation system may include a powder coating applied using a powder coating formulation with at least two components. A first component includes an uncrosslinked polymer component polyimide-containing polymer. A second component includes an uncrosslinked siloxane-containing polymer. The first component and the second component are each in solid form at room temperature under standard conditions.

12 Claims, No Drawings

INSULATION SYSTEM FOR ELECTRIC ROTATING MACHINES, METHOD OF PRODUCTION FOR SAME AND POWDER COATING

CROSS-REFERENCE TO RELATED APPLICATIONS

This application is a U.S. National Stage Application of International Application No. PCT/EP2022/053767 filed Feb. 16, 2022, which designates the United States of America, and claims priority to EP Application Serial No. 21158492.5 filed Feb. 22, 2021, the contents of which are hereby incorporated by reference in their entirety.

TECHNICAL FIELD

The present disclosure relates to insulation systems. Various embodiments of the teachings herein include insulation for an electrical rotating machine, especially electric motor and/or generator, powder coatings that are part of an insulation system, and/or methods of producing an insulation system.

BACKGROUND

Known electrical rotating machines in the mid- and high-voltage sector are those such as electric motors and electrical generators. These machines are notable for a multitude of different designs and fields of use. They are used in all fields of technology, of industry, of everyday life, of transport, of medicine and of other fields. The performance range of electrical machines extends from orders of magnitude below one microwatt, for example in microsystems technology, up to more than one gigawatt, i.e. one thousand times one million watts, for example in the power plant sector. In between these is mid-voltage use with traction and drive motors in the vehicle sector, rail vehicle sector etc.

A feature common to all rotating electrical machines is wire coils through which the electrical current flows. For electrical insulation of the parts through which current flows from one another and from the outside environment, electrical machines have insulation systems. Electrical rotating machines, for example electric motors and generators over and above a rated voltage of 700 V, comprise a rotor surrounded by the stator. The stator has a laminated stack in which there are grooves into which the electrical conductors are inserted in the form of coils or as individual bars that are welded or soldered to form coils. Any two corresponding individual bars may be soldered to one another to form a coil. The electrical conductor parts are insulated from one another in the coil, and the coil is additionally provided with a main insulation made of mica-containing insulation tapes and finally optionally provided, depending on the voltage level, with a conductive corona shield, especially an outer and/or terminal corona shield, such that the surface of the coil is at the same potential as the laminated stack. This construction is also called "ordered" winding, by contrast with the electrical rotating machines with wires in a "random" winding, which generally relate to electrical rotating machines of rated voltage less than 700 volts.

In the case of electrical rotating machines in the high- and/or mid-voltage sector, coils consist of conductor parts that have been insulated from one another, for example, by means of taping and/or wire lacquer. These are shaped from blanks, such as a coil loop, by drawing and twisting, such that they can be inserted into the grooves of a main stator body, i.e. into the laminated stack of the electric motor. The coils are connected to one another via what are called winding heads and contacted by corresponding terminals.

The current-conducting coils are insulated from one another, from the laminated stack and ultimately also from the environment by an insulation system. The insulation system regularly comprises the main insulation, which is a pure insulator, and the corona shielding system, which comprises the outer corona shielding and/or end corona shielding components, and a corona shielding system also exhibits low electrical conductivity for better partial discharge resistance.

The current-conducting coil is very substantially insulated from the grounded laminated stack by the main insulation composed of polymer-based materials. In order to achieve maximum performance from the machine, it is operated at the highest possible current densities, but this also gives rise to significant losses in the form of heat.

In the case of large electric motors, the maximum customary operating temperature is about 155° C. For these operating temperatures, the use of an insulation system composed of mica tape and epoxy-based thermosets is typical. The motor is designed such that the maximum heating-even of the insulation-exceeds 155° C. only insignificantly, if at all.

In order to increase the power density of such a machine, either the voltage or current is increased. If the voltage were to be increased, it would be necessary to dissipate a higher field strength across the insulation system in a sustained manner. The conventionally known epoxy-based insulation systems are not designed for this.

If the current is increased, the insulation system is subjected to greater thermal stress, at least briefly even to above 200° C. For this purpose, insulation systems comprising materials based on m-aramid and polyetherimide are used.

All components of an insulation system, i.e. main insulation and corona shield, such as outer corona shield AGS and terminal corona shield EGS, have to date generally been applied to the conductor parts as tapes, although parts thereof, as of the EGS, may also be applied by hand. The other parts also cannot be applied in a fully automated manner because either the production run size does not make automation economically viable and/or the risk of trapped air in the creases of the winding tapes means that the quality required in the winding is not assured. The tapes that are wound usually have bonded mica platelets which, in the insulation, serve to extend the erosion distance in the insulation system, i.e. the direct route from the voltage side, the conductors, to the grounded laminated stack, which results in a distinctly longer lifetime of an insulation system.

SUMMARY

The teachings of the present disclosure include insulation systems firstly applicable in an automated manner and secondly stable even at operating temperatures above 155° C., especially also up to 200° C. or 220° C. For example, some embodiments include an insulation system suitable as main insulation of an electrical rotating machine of rated voltage greater than 700 volts, wherein the insulation system is obtainable at least partly by powder coating with a powder coating formulation, wherein the powder coating formulation comprises at least two uncrosslinked polymer components, wherein at least one first uncrosslinked polyimide-containing polymer component and at least one second uncrosslinked siloxane-containing polymer component that are present in the powder coating formulation are each in solid form at room temperature under standard conditions, i.e. at about 20° C.

In some embodiments, the first uncrosslinked polyimide-containing polymer component of the powder coating formulation comprises one or more polyimides.

In some embodiments, the first uncrosslinked polyimide-containing polymer component of the powder coating formulation contains a mixture, a copolymer and/or a blend comprising multiple polymer components.

In some embodiments, the second uncrosslinked siloxane-containing polymer component of the powder coating formulation comprises one or more siloxanes.

In some embodiments, the second uncrosslinked siloxane-containing polymer component of the powder coating formulation contains a mixture, a copolymer and/or a blend comprising multiple polymer components.

In some embodiments, the two uncrosslinked polymer components take the form of a mixture, blend or copolymer.

In some embodiments, the two uncrosslinked polymer components take the form of a block copolymer.

In some embodiments, one or more siloxanes selected from the group of the glycidyl-based and/or epoxy-terminated and/or hydroxy-terminated aryl- and/or alkylsiloxanes are present in the second uncrosslinked siloxane-containing polymer component of the powder coating formulation.

In some embodiments, one or more siloxanes selected from the group of the silsesquioxanes are present in the second uncrosslinked siloxane-containing polymer component of the powder coating formulation.

In some embodiments, fillers are present in the powder coating formulation.

In some embodiments, additives are present in the powder coating formulation.

As another example, some embodiments include a powder coating as part of an insulation system of an electrical rotating machine of rated voltage greater than 700 volts, comprising solid film composed of at least two polymer components, a polyimide-containing polymer component and a siloxane-containing polymer component.

In some embodiments, the powder coating has a thickness of not less than 100 μm.

As another example, some embodiments include a method of producing an insulation system comprising a main insulation and optionally corona shielding, comprising: provision of a powder coating formulation comprising at least two uncrosslinked polymer components, wherein at least one first uncrosslinked polyimide-containing polymer component and at least one second uncrosslinked siloxane-containing polymer component that are present in the powder coating formulation are each in solid form at room temperature under standard conditions, i.e. at about 20° C., single or multiple powder coating of an electrically conductive substrate, such as optionally a conductor with preliminary insulation by partial conductor insulation, for example in the form of a coil, a bar, a winding head and/or a coil loop, followed by final curing and/or postcuring of the powder coating thus obtained.

DETAILED DESCRIPTION

The teachings of the present disclosure include an insulation system suitable as main insulation of an electrical rotating machine of rated voltage greater than 700 volts, wherein the insulation system is obtainable at least partly by powder coating with a powder coating formulation comprising at least two uncrosslinked polymer components, wherein at least one first uncrosslinked polyimide-containing polymer component and at least one second uncrosslinked siloxane-containing polymer component that are present in the powder coating formulation are each in solid form at room temperature under standard conditions, i.e. at about 20° C.

The teachings also include a method of producing an insulation system comprising a main insulation and optionally corona shielding, comprising:

- provision of a powder coating formulation comprising at least two uncrosslinked polymer components, wherein at least one first uncrosslinked polyimide-containing polymer component and at least one second uncrosslinked siloxane-containing polymer component that are present in the powder coating formulation are each in solid form at room temperature under standard conditions, i.e. at about 20° C.,
- single or multiple powder coating of an electrically conductive substrate, such as optionally a conductor with preliminary insulation by partial conductor insulation, for example in the form of a coil, a bar, a winding head and/or a coil loop, followed by
- final curing and/or postcuring of the powder coating thus obtained.

In some embodiments, there is a powder coating as part of an insulation system of an electrical rotating machine having a rated voltage greater than 700 volts, comprising a film composed of at least two polymer components, a polyimide-containing polymer component and a siloxane-containing polymer component.

Winding tape insulations in electrical rotating machines with rated voltage not less than 700 V can be replaced by powder coating comprising a powder coating formulation which is solid at room temperature and comprises at least two uncrosslinked polymer components, one based on polyimide and one based on siloxane, by means of powder coating operations that are readily automatable by machine. The production of the uncrosslinked powder coating formulation is possible in a simple manner by weighing and mixing, with partial melting, degassing and/or partial crosslinking of the powder coating on the substrate, the coil or coil portion. The powder coating and the obtaining of a solid film are followed by postcuring and final curing at elevated temperature.

A distinction is drawn here between 2 modes of powder coating, firstly:

- electrostatic powder coating, which works either via corona, as charged application by means of a generator, or via what is called the "tribo" method, with friction charging, and secondly the
- fluidized bed sintering method, also known from the automotive sector in the form of "powder slurry".

In electrostatic powder coating, the powder coating formulation is sprayed onto an electrically conductive workpiece. What is called a spray unit, i.e., for example, the spray gun, is used to shape the swirling powder to a defined spray jet and simultaneously electrostatically charge it, with different charging methods being possible for the method employable here.

In corona spray systems, the powder particles of the powder coating formulation are charged by additions of free air ions that are created by means of one or more voltage-conducting corona electrodes in the spray unit. In general, a negative voltage is chosen because the corona has higher current and is more stable, and back-spraying effects at the workpiece surface occur to a lesser degree. A voltage of up to 100 kV is applied at the corona electrode.

In the case of "tribo" spray systems, the powder particles of the powder coating formulation are charged exclusively via triboelectrical processes as they flow through a plastic channel in the spray unit, i.e., for example, in the spray gun, i.e. without voltage generators. This positively charges the powder particles.

The spray application is followed by curing and/or baking, where the powder coating may contain all the constituents of a normal wet lacquer except for the solvent and hence—depending on the polymer component composition—runs to give a continuous film at relatively high temperatures, for example above 100° C., especially above 120° C., and then partly gelates and cures.

Compared to wet painting operations, there are some advantages in terms of cost and/or for the environment in powder coating:

solvent-free coating material and minimal emission,
circulation of the powder coating possible,
simple manual handling of a spray gun or some other spray unit and
suitable for automation.

In some embodiments, powder coating can also be executed by a fluidized bed sintering method. This involves providing a powder bath from moving air, especially an air stream, and the fluidized powder coating formulation, and dipping a heated substrate into said powder bath—for example even for just a few seconds. On contact with the hot substrate, the powder starts to sinter and melts and/or crosslinks subsequently to give a smooth polymer layer. For example, in the production of the insulation system, final insulation of the winding heads can be effected by fluidized bed sintering at about 200° C.

In some embodiments, there are one or more first polyimide-containing polymer component(s) and one or more second siloxane-containing polymer component(s) in the powder coating formulation.

"Polyimide" in the solid but uncrosslinked powder coating refers to a monomer or oligomer of a polymer having a "polyimide group". This generally denotes a compound having a unit as shown in structural formula I:

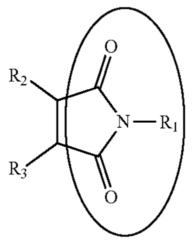

I. The polyimide group is circled.

"Siloxane" in the present context refers to a poly(organo)-siloxane and represents a group of synthetic polymers in which silicon atoms are joined by oxygen atoms, i.e. in which the —[O—SiR$_2$—O—SiR$_2$—]$_n$— unit occurs in the polymer backbone. The composition of the siloxane unit takes account of the fact that each oxygen atom is present as bridge member between two silicon atoms, where one siloxane unit may have one to four further substituents (octet rule).

In some embodiments, the second siloxane polymer component takes the form of a mixture of two or more poly (organo) siloxanes. For example, a suitable poly(organo)-siloxane may be selected from the group of the following poly(organo) siloxanes: a monomeric and/or oligomeric polymer component based on silicon-oxygen, based, for example, on alkyl- and/or arylpolysiloxane and/or on silsesquioxane.

The second uncrosslinked siloxane-containing polymer component for the powder coating formulation is an uncrosslinked siloxane polymer which, on completion of curing, forms a siloxane-containing polymer in which a —[O—SiR$_2$—O]$_n$— unit is present in the polymer backbone. "R" here represents all kinds of organic radicals that are suitable for curing and/or crosslinking to give an insulation material usable for an insulation system. In particular, R represents aryl, alkyl, heterocycles, nitrogen-, oxygen- and/or sulfur-substituted aryls and/or alkyls.

In particular, R may be the same or different and may represent the following groups:

alkyl, for example -methyl, -propyl, -isopropyl, -butyl, -isobutyl, -tert-butyl, -pentyl, -isopentyl, -cyclopentyl and all other analogs up to dodecyl, i.e. the homolog having 12 carbon atoms;
aryl, for example: phenyl, benzyl, benzoyl, biphenyl, tolyl, xylenes and comparable aromatics, in for particular, example, all aryl radicals having one or more rings, the structure of which satisfies Hückel's definition of aromaticity,
heterocycles: especially sulfur-containing heterocycles such as thiophene, tetrahydrothiophene, 1,4-thioxane and homologs and/or derivatives thereof,
oxygen-containing heterocycles, for example dioxane,
nitrogen-containing heterocycles, for example those with —CN, —CNO, —CNS substituents on the ring(s) and
sulfur-substituted aryls and/or alkyls: e.g. thiophene, but also thiols.

Hückel's rule for aromatic compounds is based on the correlation that planar, cyclically through-conjugated molecules comprising a number of Π electrons that can be represented in the form of 4n+2 have exceptional stability which is also referred to as aromaticity. For example, the monomeric or oligomeric second uncrosslinked siloxane-containing polymer component functionalized for polymerization, which has a —[O—SiR$_2$—O]$_n$ backbone, is used in the powder coating formulation as a copolymer with one or more polyimides.

The compound of the first and second polymer components may also take the form of a blend in the powder coating formulation, for example including that of a blend of a polymer comprising at least one polyimide compound with a copolymer of siloxane and polyimide, or of a blend of two copolymers: a polyimide-containing copolymer and a siloxane-containing copolymer. In particular, the first and second polymer components may also be present as a mixture, in the form of a blend.

Suitable examples as monomeric or oligomeric second uncrosslinked siloxane-containing polymer component functionalized for polymerization, which forms a —[O—SiR$_2$—O], backbone, all glycidyl-based and/or epoxy-terminated aryl- and/or alkylsiloxanes, for example glycidoxy- and/or hydroxy-functionalized siloxanes. A commercially available example is the following compound from Wacker AG which is suitable as hydroxy-functionalized polyphenylsiloxane component:

Wacker SILRES-603

Additionally suitable as second uncrosslinked siloxane-containing polymer components in the powder coating formulation based on silicon-oxygen are one or more silsesquioxanes or derivatives of silsesquioxane. This is an organic silicon-oxygen-based compound with cagelike or polymeric structures that have a —[O—SiR$_2$—O]$_n$ backbone, such as the examples shown below:

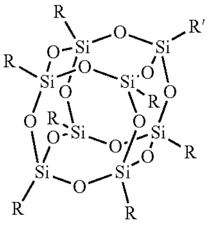

Polyhedral Oligomeric Silsesquioxanes (POSS)

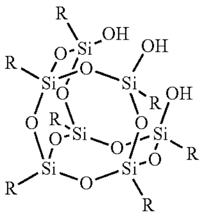

Open Cage

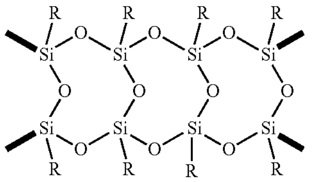

Ladder Structure

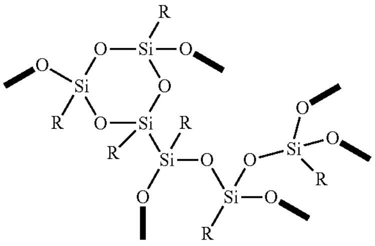

Random Structure

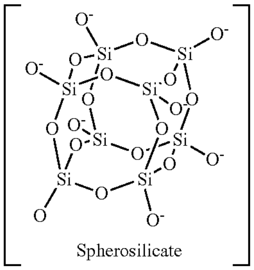

Spherosilicate

In particular, R here may be the same or different and may be the following groups:

- alkyl, for example -methyl, -propyl, -isopropyl, -butyl, -isobutyl, -tert-butyl, -pentyl, -isopentyl, -cyclopentyl and all other analogs up to dodecyl, i.e. the homolog having 12 carbon atoms;
- aryl, for example: benzyl, benzoyl, biphenyl, tolyl, xylenes and comparable aromatics, in particular, for example, all aryl radicals having one or more rings, the structure of which satisfies Hückel's definition of aromaticity,
- heterocycles: especially sulfur-containing heterocycles such as thiophene, tetrahydrothiophene, 1,4-thioxane and homologs and/or derivatives thereof,
- oxygen-containing heterocycles, for example dioxane,
- nitrogen-containing heterocycles, for example those with —CN, —CNO, —CNS substituents on the ring(s) and
- sulfur-substituted aryls and/or alkyls: e.g. thiophene, but also thiols.
- A commercially available example is the following compound from Dow GmbH Europe as hydroxy-functionalized polysilsesquioxane:

Dowsil RSN-0217

In some embodiments, the powder coating formulation is applied in such a way as to result in a thickness of the insulation layer and/or corona shielding layer formed therefrom of >/=100 μm. This layer may be produced in single-layer or multilayer form by powder coating.

In some embodiments, the formulation further comprises fillers, especially sphere-shaped and/or irregular-shaped fillers. The fillers may be crystalline and/or amorphous.

In some embodiments, the fillers are based on silicon dioxide; for example, they contain fused silica, ground quartz and/or quartz glass.

The resistance of the sprayable powder formulation is increased by adding fillers, especially mineral or/and synthetic fillers, such as ground quartz, fused silica, ground glass, in a proportion by mass of, for example, 5% by weight to 65% by weight, if at least some of the resin is exchanged for a partial discharge-resistant component. The partial discharge-resistant component refers here to the second resin component which is based on silicon rather than carbon. This may either be a polysiloxane or a silsesquioxane, or one derivative or a mixture of two or more derivatives of these silicon-containing compounds with oxygen. For instance, it is possible to dispense with the use of large mica platelets bonded to the tape and to apply and produce the insulation material in the form of a powder coating formulation in an automated manner by spraying and/or dipping.

In some embodiments, the provision of the powder coating formulation supplemented by the addition of electrically conductive filler, optionally in two or more fractions.

In some embodiments, the powder coating operation is performed in an automated manner.

In some embodiments, the powder coating formulation which is in the form of a powder of solids at room temperature also comprises fillers, especially in two or more fractions, and sintering aids and/or additives. In the case of provision of a powder coating for production of an electrically partly conductive or conductive component of the insulation system, electrically conductive fillers are added to the powder coating formulation, optionally in two or more fractions.

In some embodiments, one or more additives may be present in the powder coating formulation. For example, additives for improving processibility may be present.

In some embodiments, additives for increasing the stability of the insulation system may be present. For example, one or more metal oxide(s), for example $TiO_2$ and/or those with one of the following empirical formulae $Na_8Al_6Si_6O_{24}S_4$ and/or $Na_6Al_6Si_6O_{24}S_2$ are possible. Further additives may be $Fe_2O_3$ and/or $MnFe_2O_4$ and/or electrically nonconductive carbon-based fillers, for example industrial carbon black. If required, the additive particles may be provided partly or wholly, over the full area or part of the area, with an $SiO_2$ coating. These additives are especially also oxidation-inhibiting, such that the heat class or temperature index of a powder coating produced therewith can be increased further.

Additives are mixed in, for example, in the production of the powder coating formulation. Further additives, leveling aids, colour pigments, quartz particles and others may be mixed into the powder coating formulation. The proportion of additive in the powder coating is, for example, in the range between 0.05% and 10% by weight, especially in the range between 0.05% and 2% by weight and more preferably in the range between 0.1% and 1% by weight.

By virtue of replacing the known winding tape insulation systems wholly or partly with powder coatings and/or applying them in an automated manner, it is possible not just to omit winding tape application by hand without losses of quality of the insulation system, but even to automate production. The partial discharge resistance of the insulation material is increased by the presence of a certain amount of —[O—$SiR_2$—O], backbone in the monomer and/or oligomer of the powder coating formulation and hence also in the ready-cured insulation system compared to a pure polyimide to such an extent as to result in an economically viable electrical lifetime of the insulation system.

What is claimed is:

1. An insulation system suitable as main insulation of an electrical rotating machine of rated voltage greater than 700 volts, the insulation system comprising:

a powder coating applied using a dry powder coating formulation with at least two components;

wherein a first component includes an uncrosslinked polymer component polyimide-containing polymer; and a second component includes an uncrosslinked siloxane-containing polymer;

wherein the first component and the second component are each in solid form at room temperature under standard conditions; and the powder coating formulation includes no solvents.

2. The insulation system as claimed in claim 1, wherein the first component includes a mixture, a copolymer, and/or a blend of multiple polymer components.

3. The insulation system as claimed in claim 1, wherein the second component includes a mixture, a copolymer, and/or a blend of multiple polymer components.

4. The insulation system as claimed in claim 1, wherein the first component and the second component are combined to form a mixture, a blend, or a copolymer.

5. The insulation system as claimed in claim 1, wherein the first component and the second component are combined to form a block copolymer.

6. The insulation system as claimed in claim 1, wherein the second component comprises one or more siloxanes selected from the group of the glycidyl-based and/or epoxy-terminated and/or hydroxy-terminated aryl- and/or alkylsiloxanes.

7. The insulation system as claimed in claim 1, wherein the second component comprises one or more silsesquioxanes.

8. The insulation system as claimed in claim 1, wherein the powder coating formulation includes fillers.

9. The insulation system as claimed in claim 1, wherein the powder coating formulation includes additives.

10. A powder coating made part of an insulation system of an electrical rotating machine of rated voltage greater than 700 volts, the powder coating comprising:

a solid film composed of at least two polymer components;

wherein the first component includes a polyimide-containing polymer; and the second component includes a siloxane-containing polymer.

11. The powder coating as claimed in claim 10, with a thickness of not less than 100 μm.

12. A method of producing an insulation system comprising a main insulation and optionally corona shielding, the method comprising:

providing a dry powder coating formulation with at least two components, wherein the first component includes an uncrosslinked polyimide-containing polymer and the second component includes an uncrosslinked siloxane-containing polymer, wherein the first component and the second component are each in solid form at room temperature under standard conditions, wherein the dry powder coating formulation includes no solvent;

applying the powder coating formulation to an electrically conductive substrate; and curing the powder coating.

* * * * *